(12) United States Patent
Park (10) Patent No.: US 10,754,552 B2
(45) Date of Patent: Aug. 25, 2020

(54) DATA STORAGE DEVICE AND OPERATING METHOD THEREOF

(71) Applicant: SK hynix Inc., Gyeonggi-do (KR)

(72) Inventor: Jeen Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 132 days.

(21) Appl. No.: 15/847,459

(22) Filed: Dec. 19, 2017

(65) Prior Publication Data

US 2019/0065054 A1 Feb. 28, 2019

(30) Foreign Application Priority Data

Aug. 28, 2017 (KR) .......................... 10-2017-0108792

(51) Int. Cl.
*G06F 3/06* (2006.01)
*G06F 12/0875* (2016.01)
*G06F 13/24* (2006.01)
*G06F 12/02* (2006.01)
*G06F 13/16* (2006.01)

(52) U.S. Cl.
CPC ............ *G06F 3/061* (2013.01); *G06F 3/0659* (2013.01); *G06F 3/0679* (2013.01); *G06F 12/0246* (2013.01); *G06F 12/0875* (2013.01); *G06F 13/1668* (2013.01); *G06F 13/24* (2013.01); *G06F 2212/1024* (2013.01); *G06F 2212/452* (2013.01); *G06F 2212/7202* (2013.01); *G06F 2212/7203* (2013.01)

(58) Field of Classification Search
None
See application file for complete search history.

(56) References Cited

U.S. PATENT DOCUMENTS

| 7,930,589 B2* | 4/2011 | Lavastre | G06F 12/0246 |
| | | | 714/23 |
| 2003/0135789 A1* | 7/2003 | DeWitt, Jr. | G06F 11/3466 |
| | | | 714/38.13 |
| 2004/0024957 A1* | 2/2004 | Lin | G06F 11/1068 |
| | | | 711/103 |

(Continued)

FOREIGN PATENT DOCUMENTS

| KR | 100598907 | 7/2006 |
| KR | 1020140093855 | 7/2014 |

*Primary Examiner* — Reginald G Bragdon
*Assistant Examiner* — James J. Thomas
(74) *Attorney, Agent, or Firm* — IP & T Group LLP (57) ABSTRACT

A data storage device includes a controller including a descriptor generation unit suitable for generating a descriptor and a memory controller suitable for generating a command based on the descriptor; and a nonvolatile memory device including a cell region, and suitable for reading first data from the cell region and buffering the first data in response to a first read command transmitted from the memory controller and outputting the first data to the controller in response to a first cache output command transmitted from the memory controller. The descriptor generation unit transmits an interrupt descriptor to the memory controller. The memory controller generates an interrupt to the descriptor generation unit based on the interrupt descriptor, and transmits the first cache output command to the nonvolatile memory device according to an instruction of the descriptor generation unit for the interrupt.

12 Claims, 7 Drawing Sheets

(56) References Cited

U.S. PATENT DOCUMENTS

| | | | | |
|---|---|---|---|---|
| 2004/0218631 | A1* | 11/2004 | Ganfield | H04L 49/90 370/474 |
| 2005/0228920 | A1* | 10/2005 | Shah | G06F 13/24 710/267 |
| 2006/0271739 | A1* | 11/2006 | Tsai | G06F 3/0611 711/123 |
| 2015/0134867 | A1* | 5/2015 | Hildner | G06F 13/24 710/267 |
| 2018/0046371 | A1* | 2/2018 | Kim | G06F 3/0656 |

* cited by examiner

DATA STORAGE DEVICE AND OPERATING METHOD THEREOF

CROSS-REFERENCES TO RELATED APPLICATION

The present application claims priority under 35 U.S.C. § 119(a) to Korean application number 10-2017-0108792, filed on Aug. 28, 2017, which is herein incorporated by reference in its entirety.

BACKGROUND

1. Technical Field

Various embodiments generally relate to a data storage device, and, more particularly, to a data storage device including a nonvolatile memory device.

2. Related Art

A data storage device may be configured to store the data provided from an external device, in response to a write request from the external device. Also, the data storage device may be configured to provide stored data to the external device, in response to a read request from the external device. The external device is an electronic device capable of processing data and may include a computer, a digital camera or a mobile phone. The data storage device may operate by being built in the external device, or may operate by being manufactured separately and then being coupled to the external device.

SUMMARY

In an embodiment, a data storage device may include: a controller including: a descriptor generation unit suitable for generating a descriptor; and a memory controller suitable for generating a command based on the descriptor; and a nonvolatile memory device including a cell region, and suitable for reading first data from the cell region and buffering the first data in response to a first read command transmitted from the memory controller and outputting the first data to the controller in response to a first cache output command transmitted from the memory controller, wherein the descriptor generation unit transmits an interrupt descriptor to the memory controller, and wherein the memory controller generates an interrupt to the descriptor generation unit based on the interrupt descriptor, and transmits the first cache output command to the nonvolatile memory device according to an instruction of the descriptor generation unit for the interrupt.

In an embodiment, a method for operating a data storage device may include: transmitting a first read command to a nonvolatile memory device based on a first read descriptor, by a memory controller; reading, by the nonvolatile memory device, first data from a cell region and buffering the first data in response to the first read command; generating, by the memory controller, an interrupt to a descriptor generation unit based on an interrupt descriptor; transmitting, by the memory controller, a first cache output command to the nonvolatile memory device according to an instruction of the descriptor generation unit for the interrupt; and outputting the first data in response to the first cache output command, by the nonvolatile memory device.

BRIEF DESCRIPTION OF THE DRAWINGS

The above and other features and advantages of the present invention will become more apparent to those skilled in the art to which the present invention belongs by describing various embodiments thereof with reference to the attached drawings in which.

DETAILED DESCRIPTION

Hereinafter, a data storage device and an operating method thereof according to the present invention will be described with reference to the accompanying drawings through exemplary embodiments of the present invention. The present invention may, however, be embodied in different forms and should not be construed as being limited to the embodiments set forth herein. Rather, these embodiments are provided to describe the present invention in detail to the extent that a person skilled in the art to which the invention pertains can enforce the technical concepts of the present invention.

It is to be understood that embodiments of the present invention are not limited to the particulars shown in the drawings, that the drawings are not necessarily to scale, and, in some instances, proportions may have been exaggerated in order to more clearly depict certain features of the invention. While particular terminology is used, it is to be appreciated that the terminology used is for describing particular embodiments only and is not intended to limit the scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The phrase "at least one of . . . and . . . ," when used herein with a list of items, means a single item from the list or any combination of items in the list. For example "at least one of A, B, and C" means, only A, or only B, or only C or any combination of A, B, and C.

The term "or" as used herein means either one of two or more alternatives but not both nor any combinations thereof.

As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art, and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element also referred to as a feature described in connection with one embodiment may be used singly or in combination with other elements of another embodiment, unless specifically indicated otherwise.

Hereinafter, the various embodiments of the present invention will be described in detail with reference to the attached drawings.

Figure 1:
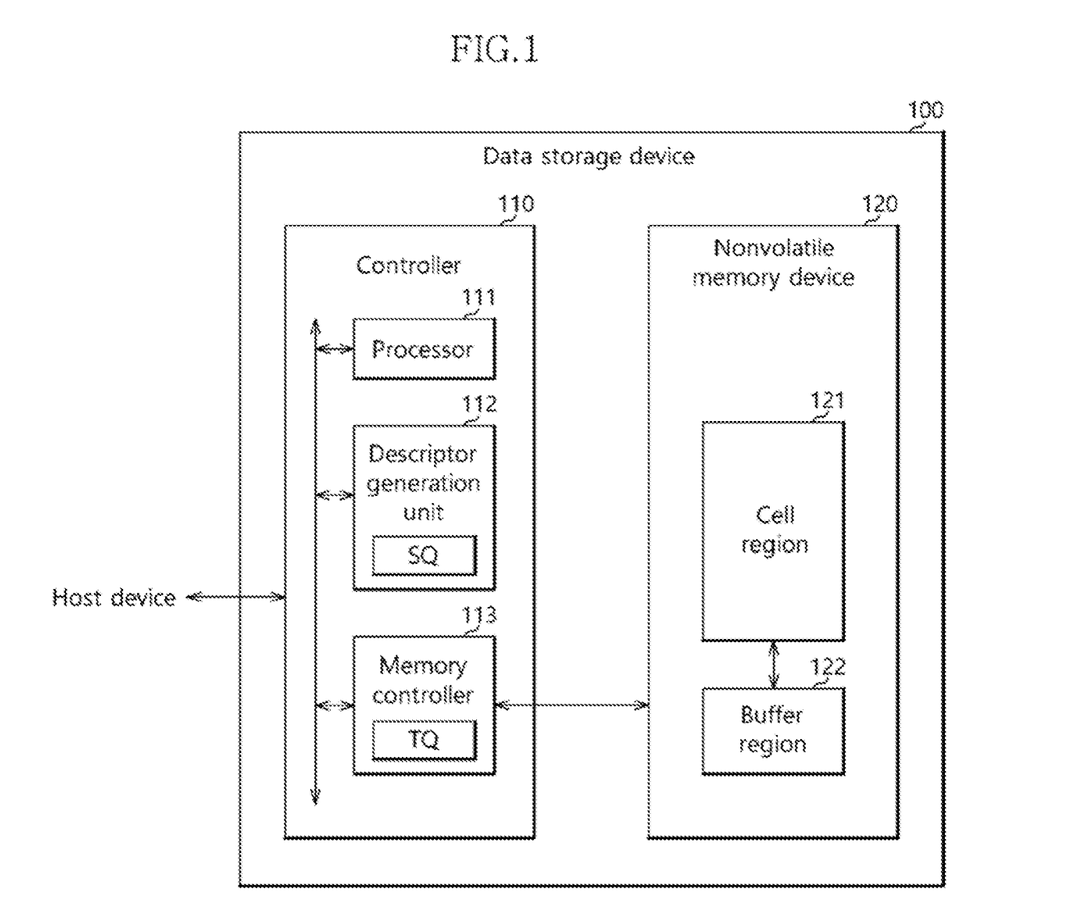
FIG. 1 is a block diagram illustrating an example of a data storage device in accordance with an embodiment.

FIG. 1 is a block diagram illustrating an example of a data storage device 100 in accordance with an embodiment.

The data storage device 100 may be configured to store data provided from a host device, in response to a write request from the host device. Also, the data storage device 100 may be configured to provide stored data to the host device, in response to a read request from the host device.

The data storage device 100 may be configured by a Personal Computer Memory Card International Association (PCMCIA) card, a Compact Flash (CF) card, a smart media card, a memory stick, various multimedia cards (MMC, eMMC, RS-MMC, and MMC-Micro), various secure digital cards (SD, Mini-SD, and Micro-SD), a Universal Flash Storage (UFS), a Solid State Drive (SSD) and the like.

The data storage device 100 may include a controller 110 and a nonvolatile memory device 120.

The controller 110 may control general operations of the data storage device 100. The controller 110 may store data in the nonvolatile memory device 120 in response to a write request transmitted from the host device, and may read data stored in the nonvolatile memory device 120 and transmit read data to the host device in response to a read request transmitted from the host device.

The controller 110 may include a processor 110, a descriptor generation unit 112 and a memory controller 113.

The processor 111 may control the descriptor generation unit 112 to generate an appropriate descriptor according to an access request of the host device. To perform an internal management operation of the data storage device 100 regardless of an access request of the host device, the processor 111 may control the descriptor generation unit 112 to generate an appropriate descriptor. The internal management operation is an operation to be performed to extend the lifetime and retain the optimal operational performance of the data storage device 100 and may include, for example, a garbage collection operation, a wear leveling operation, a read reclaim operation, etc.

The descriptor generation unit 112 may provide a descriptor to the memory controller 113 according to control of the processor 111. A descriptor may be a description for a command to be transmitted to a nonvolatile memory device. The descriptor transmitted to the memory controller 113 may be stored in an execution queue TQ of the memory controller 113.

According to an embodiment, the execution queue TQ may be separately positioned outside the memory controller 113. The descriptor generation unit 112 may store a descriptor in an external execution queue TQ, and may control the memory controller 113 to refer to the descriptor stored in the execution queue TQ. In the following description, an operation of the descriptor generation unit 112 to transmit a descriptor to the memory controller 113 may be interpreted as an operation of storing a descriptor in the separate execution queue TQ to allow the memory controller 113 to refer to the descriptor.

As will be described later, the descriptor generation unit 112 may generate, for example, a read descriptor, a cache output descriptor and an interrupt descriptor.

The descriptor generation unit 112 may include a suspension queue SQ. The suspension queue SQ may queue a cache output descriptor. The descriptor generation unit 112 may generate a read descriptor and a cache output descriptor to obtain the data stored in the nonvolatile memory device 120, transmit the read descriptor to the memory controller 113, and queue the cache output descriptor in the suspension queue SQ.

The queued cache output descriptor of the suspension queue SQ may be transmitted to the execution queue TQ in succession to a second read descriptor, which is subsequent to a first read descriptor, when the subsequent second read operation to the nonvolatile memory device 120 is scheduled. Further, the queued cache output descriptor of the suspension queue SQ may remain queued in the suspension queue SQ until an interrupt by the memory controller 113 is generated.

According to an embodiment, the suspension queue SQ may be separately positioned outside the descriptor generation unit 112.

The memory controller 113 may generate a command based on the descriptor queued in the execution queue TQ working in a first-in-first-out (FIFO) manner, and may transmit the command to the nonvolatile memory device 120.

In detail, the memory controller 113 may generate a read command based on a read descriptor, and transmit the read command to the nonvolatile memory device 120. The nonvolatile memory device 120 may read data from a cell region 121 and buffer the data in a buffer region 122, in response to the read command.

Further, the memory controller 113 may generate a cache output command based on a cache output descriptor queued in the execution queue TQ, and transmit the cache output command to the nonvolatile memory device 120. The nonvolatile memory device 120 may output the data buffered in the buffer region 122, to the memory controller 113, in response to the cache output command.

The memory controller 113 may generate a predetermined command based on the interrupt descriptor and transmit the predetermined command to the nonvolatile memory device 120, and generate an interrupt. The interrupt may be to call the descriptor generation unit 112. The predetermined command may be, for example, a state check command. The nonvolatile memory device 120 may output information on the current state of the nonvolatile memory device 120, for example, information on on-going/completed state of an operation in response to the state check command.

As described above, when transmitting a first read descriptor, which is now queued in the execution queue TQ, for first data stored in the nonvolatile memory device 120, to the memory controller 113, the descriptor generation unit 112 may queue a first cache output descriptor for the first data, in the suspension queue SQ. If a second read operation for second data stored in the nonvolatile memory device 120 is scheduled subsequently to the first read operation, the descriptor generation unit 112 may successively queue a subsequent second read descriptor for the second data and the queued first cache output descriptor for the first data in the execution queue TQ of the memory controller 113. The second read descriptor and the first cache output descriptor transmitted to the memory controller 113 may be successively stored in the execution queue TQ.

The memory controller 113 may transmit, based on the second read descriptor and the first cache output descriptor, which are successively queued in the execution queue TQ, a second read command for the second data and a first cache output command for the first data, to the nonvolatile memory device 120. Accordingly, the nonvolatile memory device 120 may read out the second data from the cell region 121 to the buffer region 122 in response to the second read command, and at the same time, may transmit the first data buffered in the buffer region 122 to the memory controller 113, in response to the first cache output command.

Furthermore, when a second read operation for the nonvolatile memory device 120 is not scheduled subsequently to the first read operation and thus the queued first cache output descriptor remains queued in the suspension queue SQ, the first data may also remain buffered in the buffer region 122. Such a situation may delay the completion of the processing of a read request from the host device.

According to the present embodiment, in order to prevent the case in which the first data is kept buffered in the buffer region 122, when a predetermined execution condition is satisfied even though a second read operation to the nonvolatile memory device 120 is not scheduled, the descriptor generation unit 112 may transmit the first cache output descriptor, which is queued in the suspension queue SQ, to the memory controller 113 without a second read descriptor for a subsequent second read operation. In this case, the memory controller 113 may generate a first cache output command based on the first cache output descriptor, and transmit the first cache output command to the nonvolatile memory device 120 without a second read command. Accordingly, the nonvolatile memory device 120 may output the first data buffered in the buffer region 122 to the memory controller 113.

The predetermined execution condition for processing the first cache output descriptor queued in the suspension queue SQ may be that an interrupt is generated and a subsequent read operation to the nonvolatile memory device 120 is not scheduled when the interrupt is generated.

In detail, the descriptor generation unit 112 may transmit an interrupt descriptor to the memory controller 113 after a read descriptor such that the descriptor generation unit 112 is called by the interrupt while the nonvolatile memory device 120 performs a read operation according to the read descriptor.

The memory controller 113 may generate the interrupt based on the interrupt descriptor.

The descriptor generation unit 112 may determine whether a subsequent read operation to the nonvolatile memory device 120 is scheduled or not, in response to the interrupt. When a subsequent read operation is scheduled, the descriptor generation unit 112 may neglect the interrupt. The descriptor generation unit 112 may transmit a cache output descriptor queued in the suspension queue SQ to the memory controller 113 when a subsequent read operation is not scheduled.

The descriptor generation unit 112 may determine whether a subsequent read operation is scheduled or not, depending on a cache output descriptor queued in the suspension queue SQ.

A method for operating the descriptor generation unit 112 and the memory controller 113 will be described later in detail.

The nonvolatile memory device 120 may store the data transmitted from the controller 110 and may read stored data and output the read data to the controller 110, according to the control of the controller 110.

The nonvolatile memory device 120 may include the cell region 121 and the buffer region 122.

The cell region 121 may be a region where data are actually stored. Although not shown, the cell region 121 may include a plurality of memory cells. Each of the memory cells may store at least one data bit.

The buffer region 122 may buffer data to be stored in the cell region 121 and data to be outputted to the memory controller 113. The buffer region 122 may be realized by a volatile memory or a nonvolatile memory.

The nonvolatile memory device 120 may perform a read operation in response to a read command transmitted from the memory controller 113. That is, the nonvolatile memory device 120 may read data from the cell region 121 and buffer the data in the buffer region 122, in response to the read command.

The nonvolatile memory device 120 may perform a cache output operation in response to a cache output command transmitted from the memory controller 113. That is, the nonvolatile memory device 120 may output the data buffered in the buffer region 122, to the memory controller 113, in response to the cache output command.

The nonvolatile memory device 120 may simultaneously perform a read operation and a cache output operation when a read command and a cache output command are successively transmitted. That is, the nonvolatile memory device 120 may read data from the cell region 121 in response to the read command, and at the same time, may output the data buffered in the buffer region 122, to the memory controller 113.

The nonvolatile memory device 120 may perform a state check operation in response to a state check command. The nonvolatile memory device 120 may output state information on a current state in response to the state check command.

The nonvolatile memory device 120 may include a flash memory, such as a NAND flash or a NOR flash, a Ferroelectrics Random Access Memory (FeRAM), a Phase-Change Random Access Memory (PCRAM), a Magnetoresistive Random Access Memo (MRAM), a Resistive Random Access Memory (ReRAM), and the like.

While it is illustrated in FIG. 1 that the data storage device 100 includes one nonvolatile memory device 120, it is to be noted that the number of nonvolatile memory devices included in the data storage device 100 is not limited thereto.

Figure 2:
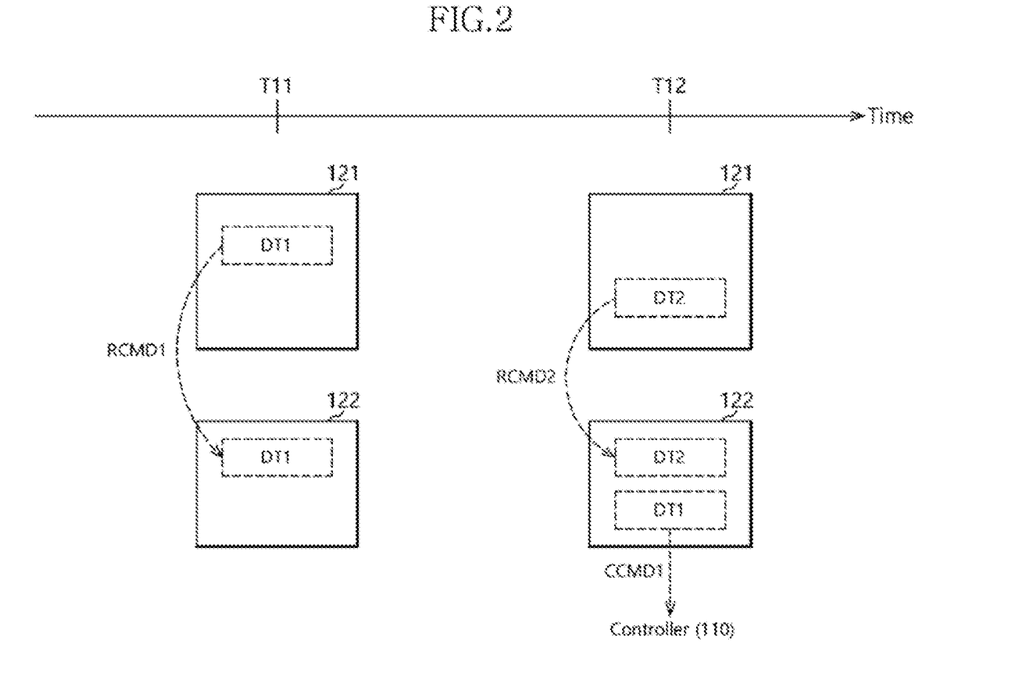
FIG. 2 is an example of a diagram to assist in the description of a method for a nonvolatile memory device to simultaneously perform a read operation and a cache output operation in accordance with the embodiment.

FIG. 2 is an example of a diagram to assist in the description of a method for the nonvolatile memory device 120 to simultaneously perform a read operation and a cache output operation in accordance with the embodiment.

Referring to FIG. 2, at a time T11, the controller 110 may transmit a first read command RCMD1 to the nonvolatile memory device 120. The nonvolatile memory device 120 may read first data DT1 from the cell region 121 and buffer the first data DT1 in the buffer region 122, in response to the first read command RCMD1.

At a time T12, the controller 110 may successively transmit a second read command RCMD2 and a first cache output command CCMD1 to the nonvolatile memory device 120. The nonvolatile memory device 120 may read second data DT2 from the cell region 121 in response to the second read command RCMD2, and at the same time, may output the first data DT1 to the controller 110 in response to the first cache output command CCMD1. Therefore, since a process of outputting the first data DT1 to the controller 110 and a process of reading the second data DT2 from the cell region 121 overlap, the read performance of the data storage device 100 may be improved.

If the second read command RCMD2 to be transmitted to the nonvolatile memory device 120 does not exist, the nonvolatile memory device 120 may keep the first data DT1 buffered in the buffer region 122. If such a data cache state is prolonged, since the completion of the processing of a read request from the host device is delayed, the latency characteristic of the data storage device 100 may deteriorate.

Figure 3:
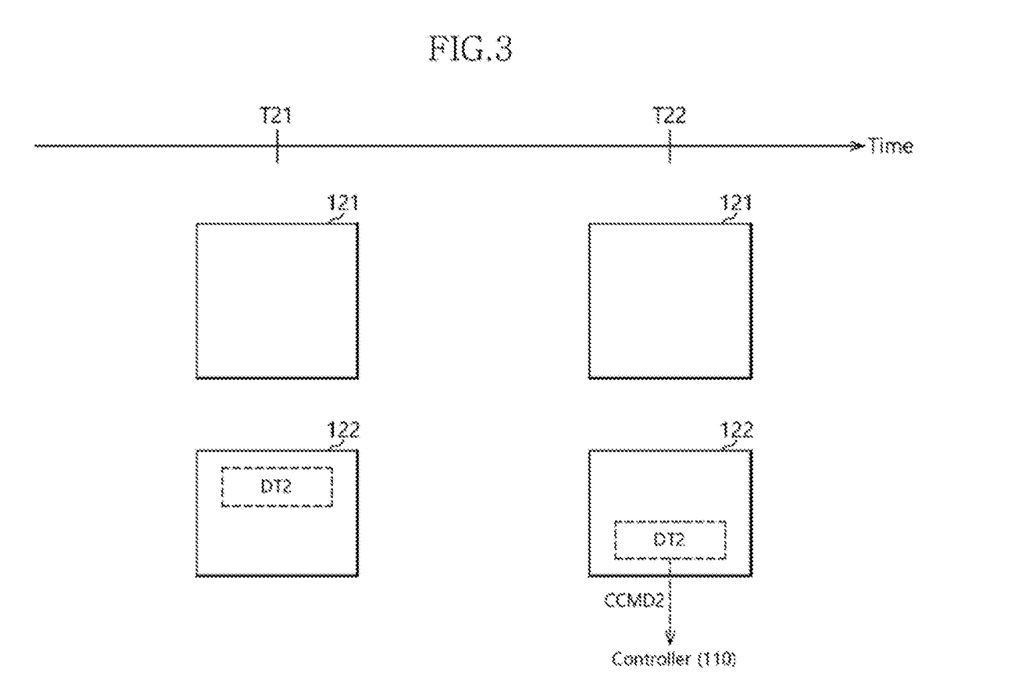
FIG. 3 is an example of a diagram to assist in the description of a method for the nonvolatile memory device to perform a cache output operation in accordance with the embodiment.

FIG. 3 is an example of a diagram to assist in the description of a method for the nonvolatile memory device 120 to perform a cache output operation in accordance with the embodiment.

Referring to FIG. 3, the situation of a time T21 may be, for example, a situation in which, after the time T12 of FIG. 2, the second data DT2 is kept buffered in the buffer region 122.

At a time T22, when a subsequent third read operation to the nonvolatile memory device 120 is not scheduled, the controller 110 may transmit only a second cache output command CCMD2 to the nonvolatile memory device 120 without a subsequent read command depending on the predetermined execution condition. The nonvolatile memory device 120 may output the second data DT2 to the controller 110 in response to the second cache output command CCMD2.

Figure 4:
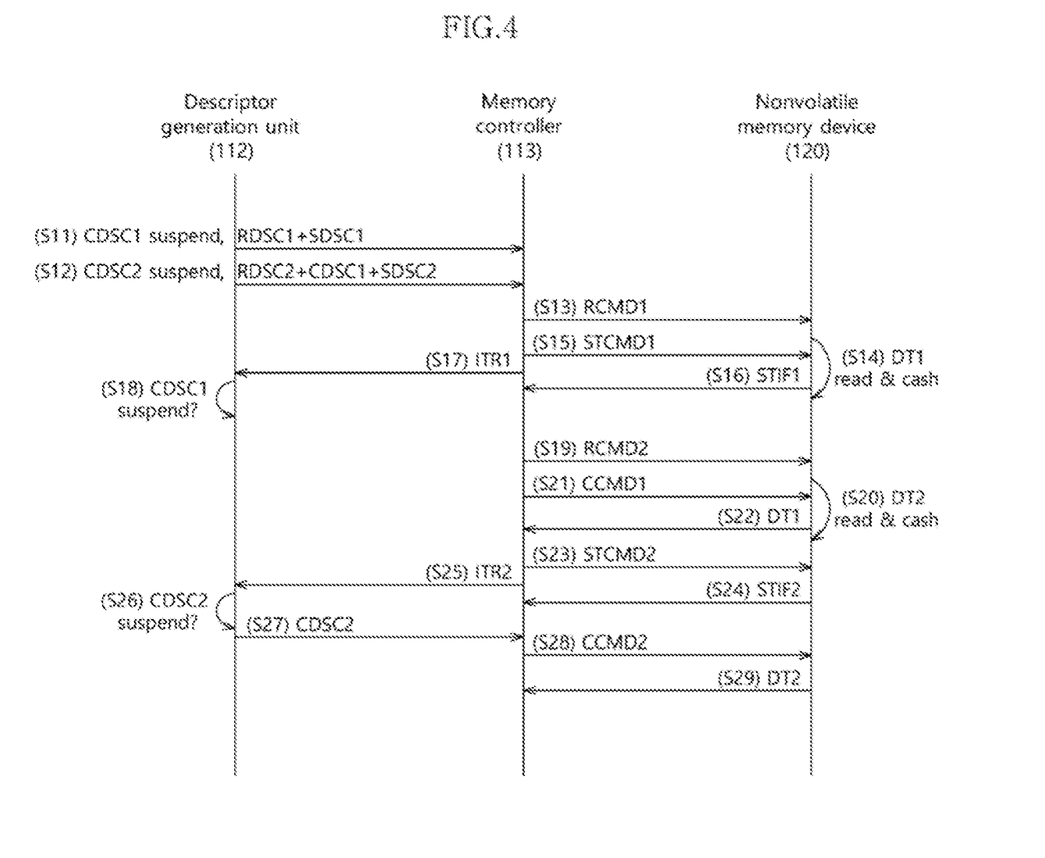
FIG. 4 is an example of a diagram to assist in the description of a method for operating a data storage device in accordance with an embodiment.

FIG. 4 is an example of a diagram to assist in the description of a method for operating the data storage device 100 in accordance with an embodiment. FIG. 4 shows operations of the descriptor generation unit 112 and the memory controller 113 in both cased of when a subsequent read operation is scheduled and is not scheduled upon generation of an interrupt. Before the operation of FIG. 4 starts, no data is previously buffered in the buffer region 122 of the nonvolatile memory device 120.

Referring to FIG. 4, at step S11, the descriptor generation unit 112 may transmit a first read descriptor RDSC1 and a first interrupt descriptor SDSC1 to the memory controller 113 for a first read operation. The first read descriptor RDSC1 may be for first data DT1 stored in the nonvolatile memory device 120. The first read descriptor RDSC1 and the first interrupt descriptor SDSC1 may be queued in the execution queue TQ.

Further, the descriptor generation unit 112 may queue a first cache output descriptor CDSC1 for the first data DT1, in the suspension queue SQ.

At step S12, a second read operation subsequent to the first read operation may have been scheduled. Therefore, the descriptor generation unit 112 may transmit a second read descriptor RDSC2 for a second read operation, the first cache output descriptor CDSC1 and a second interrupt descriptor SDSC2 to the memory controller 113. The second read descriptor RDSC2 may be for second data DT2 stored in the nonvolatile memory device 120. The second read descriptor RDSC2, the first cache output descriptor CDSC1, which is queued in the suspension queue SQ, and the second interrupt descriptor SDSC2 may be queue in the execution queue TQ.

That is, since a subsequent read operation by the second read descriptor RDSC2 is scheduled, the first cache output descriptor CDSC1 may not be kept queued in the suspension queue SQ anymore and be transmitted to the memory controller 113.

Further, the descriptor generation unit 112 may queue a second cache output descriptor CDSC2 for the second data DT2, in the suspension queue SQ.

At step S13, the memory controller 113 may generate a first read command RCMD1 based on the first read descriptor RDSC1, and may transmit the first read command RCMD1 to the nonvolatile memory device 120.

At step S14, the nonvolatile memory device 120 may read the first data DT1 from the cell region 121 and buffer the first data DT1 in the buffer region 122, in response to the first read command RCMD1.

At step S15, the memory controller 113 may generate a first state check command STMD1 based on the first interrupt descriptor SDSC1, and may transmit the first state check command STCMD1 to the nonvolatile memory device 120.

At step S16, the nonvolatile memory device 120 may transmit a first state information STIF1 to the memory controller 113 in response to the first state check command STCMD1.

At step S17, the memory controller 113 may generate a first interrupt ITR1 based on the first interrupt descriptor SDSC1. The first interrupt ITR1 may call the descriptor generation unit 112. The first interrupt ITR1 may be generated to indicate a position where the first read descriptor RDSC1 is queued in the execution queue TQ.

At step S18, the descriptor generation unit 112 may determine whether or not the first cache output descriptor CDSC1 corresponding to the first read descriptor RDSC1 is queued in the suspension queue SQ, in response to the first interrupt ITR1. That is, whether or not a subsequent read operation to the nonvolatile memory device 120 is scheduled may be determined depending on the first cache output descriptor CDSC1 in the suspension queue SQ.

As a result, since a subsequent read operation to the nonvolatile memory device 120 is scheduled as the second read descriptor RDSC2, the first cache output descriptor CDSC1 is transmitted to the memory controller 113 at the step S12. Thus, the descriptor generation unit 112 may neglect the first interrupt ITR1.

At step S19, the memory controller 113 may generate a second read command RCMD2 based on the second read descriptor RDSC2, and may transmit the second read command RCMD2 to the nonvolatile memory device 120.

At step S20, the nonvolatile memory device 120 may read the second data DT2 from the cell region 121 and start to buffer the second data DT2 in the buffer region 122, in response to the second read command RCMD2.

At step S21, the memory controller 113 may generate a first cache output command CCMD1 based on the first cache output descriptor CDSC1, and may transmit the first cache output command CCMD1 to the nonvolatile memory device 120.

At step S22, the nonvolatile memory device 120 may output the first data DT1 to the memory controller 113 in response to the first cache output command CCMD1. The nonvolatile memory device 120 may read the second data DT2 from the cell region 121 and buffer the second data DT2 in the buffer region 122 in response to the second read command RCMD2, and at the same time, may output the first data DT1 to the memory controller 113 in response to the first cache output command CCMD1.

At step S23, the memory controller 113 may generate a second state check command STCMD2 based on the second interrupt descriptor SDSC2, and may transmit the second state check command STCMD2 to the nonvolatile memory device 120.

At step S24, the nonvolatile memory device 120 may transmit a second state information STIF2 to the memory controller 113 in response to the second state check command STCMD2.

At step S25 the memory controller 113 may generate a second interrupt ITR2 based on the second interrupt descriptor SDSC2. The second interrupt ITR2 may call the descriptor generation unit 112. The second interrupt ITR2 may be generated to indicate a position where the second read descriptor RDSC2 is queued in the execution queue TQ.

At step S26, the descriptor generation unit 112 may determine whether or not the second cache output descriptor CDSC2 corresponding to the second read descriptor RDSC2 is queued in the suspension queue SQ, in response to the second interrupt ITR2. That is, whether or not a subsequent read operation to the nonvolatile memory device 120 is scheduled may be determined depending on the second cache output descriptor CDSC2 in the suspension queue SQ.

At step S27, the descriptor generation unit 112 may transmit the second cache output descriptor CDSC2 queued in the suspension queue SQ, to the memory controller 113.

At step S28, the memory controller 113 may generate a second cache output command CCMD2 based on the second cache output descriptor CDSC2, and may transmit the second cache output command CCMD2 to the nonvolatile memory device 120.

At step S29, the nonvolatile memory device 120 may output the second data DT2 to the memory controller 113 in response to the second cache output command CCMD2.

In summary, as in the step S18, if a subsequent read operation is scheduled when an interrupt is generated, since a cache output descriptor queued in the suspension queue SQ is processed successively to a read descriptor for the subsequent read operation and is now queued in the execution queue TQ, the descriptor generation unit 112 may neglect the interrupt.

However, as in the step S26, if a subsequent read operation is not scheduled when an interrupt is generated, the descriptor generation unit 112 may transmit a cache output descriptor being kept queued in the suspension queue SQ to the memory controller 113.

Figure 5:
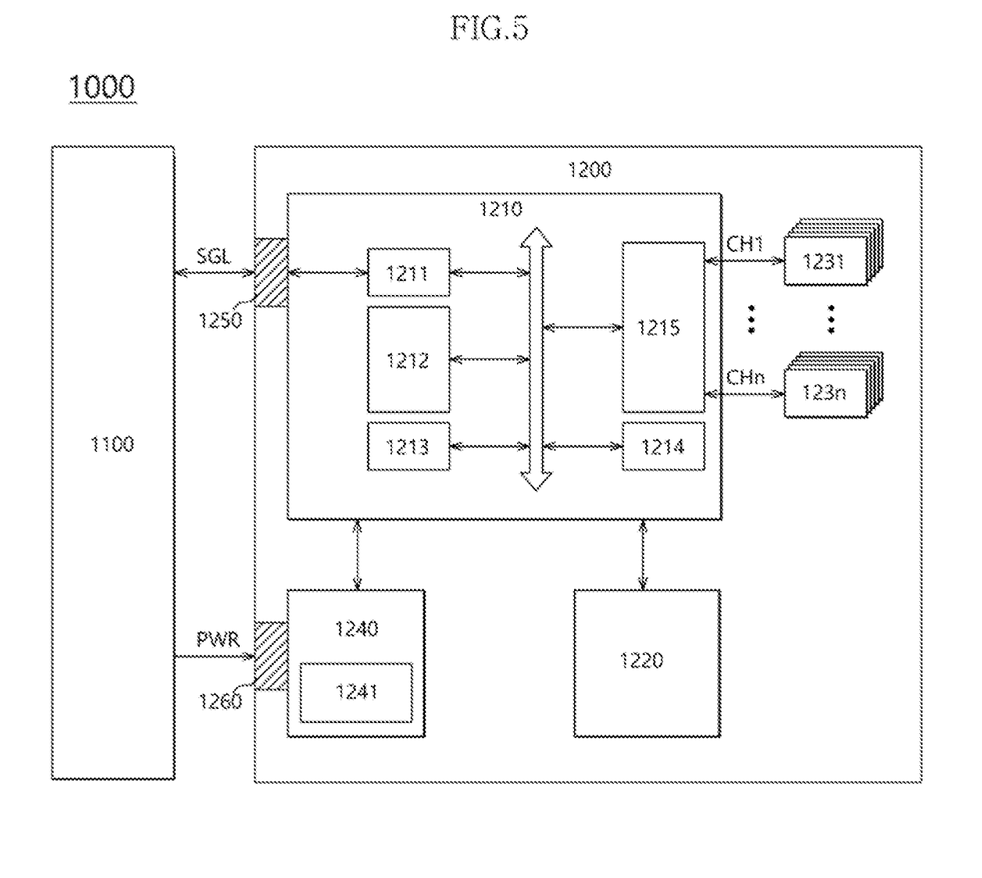
FIG. 5 is a diagram illustrating a data processing system including a solid state drive (SSD) in accordance with an embodiment.

FIG. 5 is a diagram illustrating a data processing system 1000 including a solid state drive (SSD) 1200 in accordance with an embodiment. Referring to FIG. 5, the data processing system 1000 may include a host device 1100 and the SSD 1200.

The SSD 1200 may include a controller 1210, a buffer memory device 1220, a plurality of nonvolatile memory devices 1231 to 123n, a power supply 1240, a signal connector 1250, and a power connector 1260.

The controller 1210 may control general operations of the SSD 1200. The controller 1210 may include a host interface unit 1211, a control unit 1212, a random access memory 1213, an error correction code (ECC) unit 1214, and a memory interface unit 1215.

The host interface unit 1211 may exchange a signal SGL with the host device 1100 through the signal connector 1250. The signal SGL may include a command, an address, data, and so forth. The host interface unit 1211 may interface the host device 1100 and the SSD 1200 according to the protocol of the host device 1100. For example, the host interface unit 1211 may communicate with the host device 1100 through any one of standard interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI express (PCI-E) and universal flash storage (UFS).

The control unit 1212 may analyze and process the signal SGL received from the host device 1100. The control unit 1212 may control operations of internal function blocks according to a firmware or a software for driving the SSD 1200. The random access memory 1213 may be used as a working memory for driving such a firmware or software.

The ECC unit 1214 may generate the parity data of data to be transmitted to at least one of the nonvolatile memory devices 1231 to 123n. The generated parity data may be stored together with the data in the nonvolatile memory devices 1231 to 123n. The ECC unit 1214 may detect an error of the data read from at least one of the nonvolatile memory devices 1231 to 123n, based on the parity data. If a detected error is within a correctable range, the ECC unit 1214 may correct the detected error.

The memory interface unit 1215 may provide control signals such as commands and addresses to at least one of the nonvolatile memory devices 1231 to 123n, according to control of the control unit 1212. Moreover, the memory interface unit 1215 may exchange data with at least one of the nonvolatile memory devices 1231 to 123n, according to control of the control unit 1212. For example, the memory interface unit 1215 may provide the data stored in the buffer memory device 1220, to at least one of the nonvolatile memory devices 1231 to 123n, or provide the data read from at least one of the nonvolatile memory devices 1231 to 123n, to the buffer memory device 1220.

The buffer memory device 1220 may temporarily store data to be stored in at least one of the nonvolatile memory devices 1231 to 123n. Further, the buffer memory device 1220 may temporarily store the data read from at least one of the nonvolatile memory devices 1231 to 123n. The data temporarily stored in the buffer memory device 1220 may be transmitted to the host device 1100 or at least one of the nonvolatile memory devices 1231 to 123n according to control of the controller 1210.

The nonvolatile memory devices 1231 to 123n may be used as storage media of the SSD 1200. The nonvolatile memory devices 1231 to 123n may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large capacity capacitors.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 6:
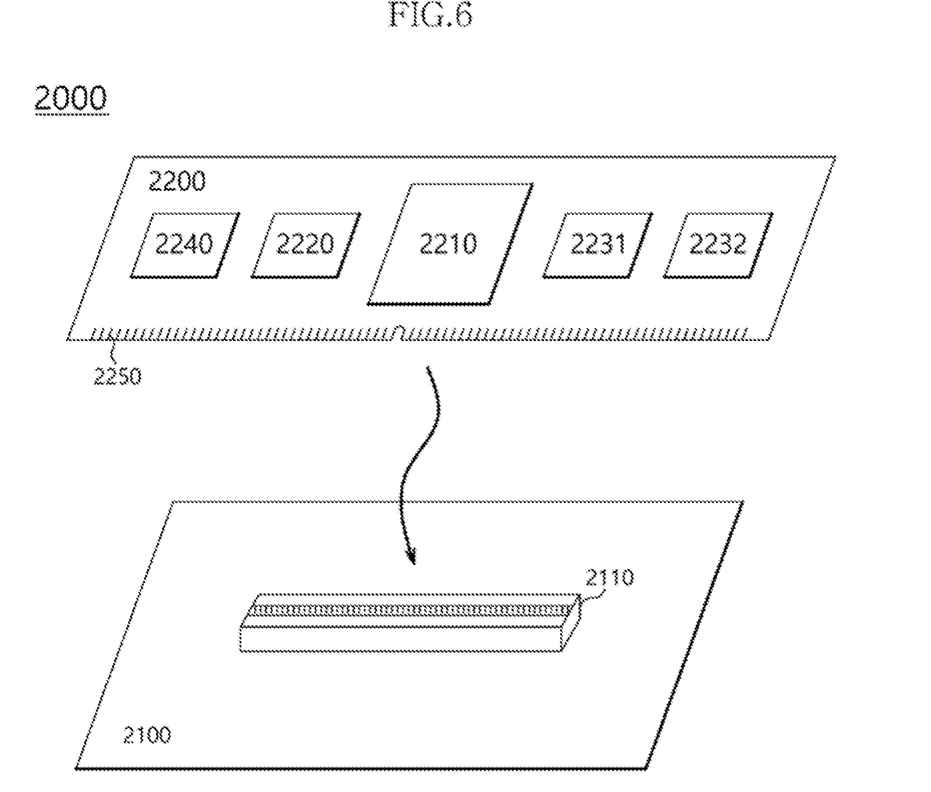
FIG. 6 is a diagram illustrating a data processing system including a data storage device in accordance with an embodiment.

FIG. 6 is a diagram illustrating a data processing system 2000 including a data storage device 2200 in accordance with an embodiment. Referring to FIG. 6, the data processing system 2000 may include a host device 2100 and the data storage device 2200.

The host device 2100 may be configured in the form of a board such as a printed circuit board. Although not shown, the host device 2100 may include internal function blocks for performing the function of a host device.

The host device 2100 may include a connection terminal 2110 such as a socket, a slot or a connector. The data storage device 2200 may be mounted to the connection terminal 2110.

The data storage device 2200 may be configured in the form of a board such as a printed circuit board. The data storage device 2200 may be referred to as a memory module or a memory card. The data storage device 2200 may include a controller 2210, a buffer memory device 2220, nonvolatile memory devices 2231 and 2232, a power management integrated circuit (PMIC) 2240, and a connection terminal 2250.

The controller 2210 may control general operations of the data storage device 2200. The controller 2210 may be configured in the same manner as the controller 1210 shown in FIG. 5.

The buffer memory device 2220 may temporarily store data to be stored in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the data storage device 2200.

The PMIC 2240 may provide the power inputted through the connection terminal 2250, to the inside of the data storage device 2200. The PMIC 2240 may manage the power of the data storage device 2200 according to control of the controller 2210.

The connection terminal 2250 may be coupled to the connection terminal 2110 of the host device 2100. Through the connection terminal 2250 signals such as commands, addresses, data and so forth, and power may be transferred between the host device 2100 and the data storage device 2200. The connection terminal 2250 may be configured into various types depending on an interface scheme between the host device 2100 and the data storage device 2200. The connection terminal 2250 may be disposed on any one side of the data storage device 2200.

Figure 7:
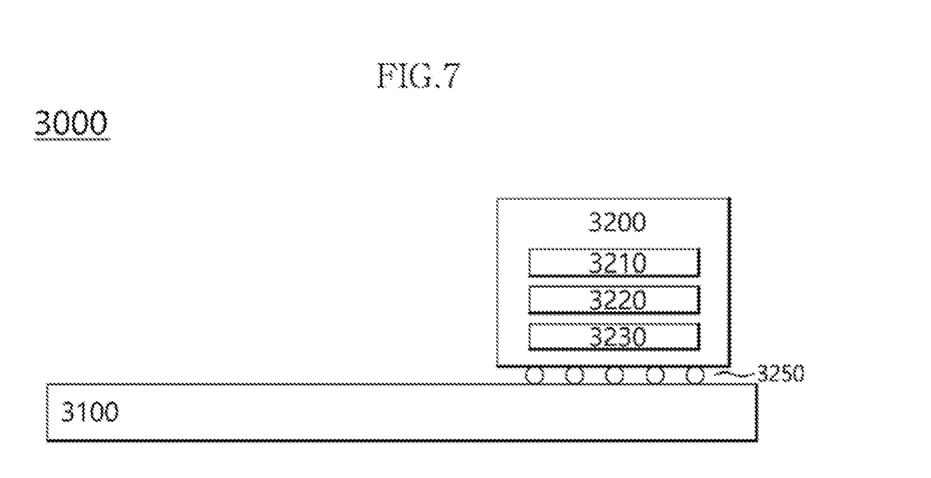
FIG. 7 is a diagram illustrating a data processing system including a data storage device in accordance with an embodiment.

FIG. 7 is a diagram illustrating a data processing system 3000 including a data storage device 3200 in accordance with an embodiment. Referring to FIG. 7, the data processing system 3000 may include a host device 3100 and the data storage device 3200.

The host device 3100 may be configured in the form of a board such as a printed circuit board. Although not shown, the host device 3100 may include internal function blocks for performing the function of a host device.

The data storage device 3200 may be configured in the form of a surface-mounting type package. The data storage device 3200 may be mounted to the host device 3100 through solder balls 3250. The data storage device 3200 may include a controller 3210, a buffer memory device 3220, and a nonvolatile memory device 3230.

The controller 3210 may control general operations of the data storage device 3200. The controller 3210 may be configured in the same manner as the controller 1210 shown in FIG. 5.

The buffer memory device 3220 may temporarily store data to be stored in the nonvolatile memory device 3230. Further, the buffer memory device 3220 may temporarily store the data read from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the data storage device 3200.

Figure 8:
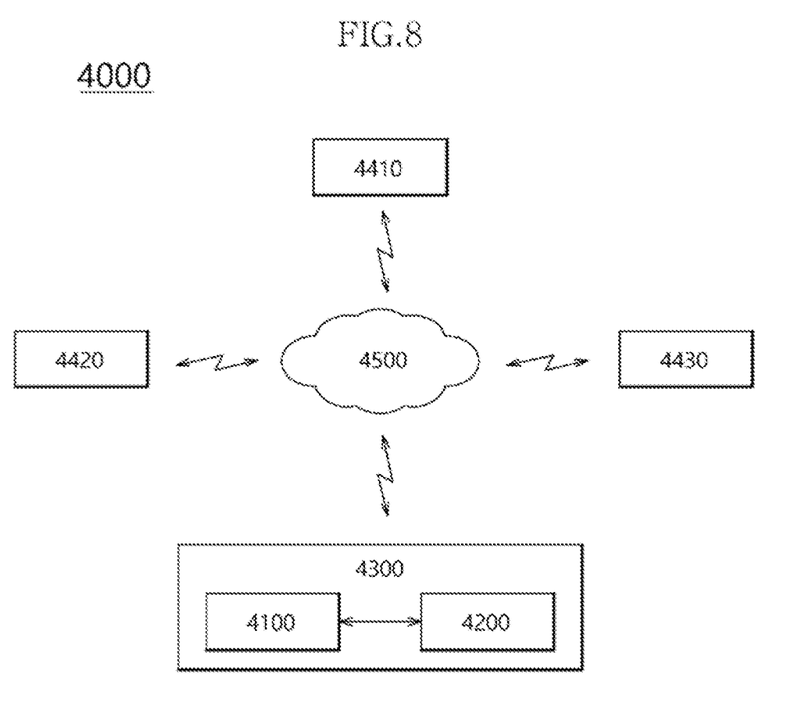
FIG. 8 is a diagram illustrating a network system including a data storage device in accordance with an embodiment.

FIG. 8 is a diagram illustrating a network system 4000 including a data storage device 4200 in accordance with an embodiment. Referring to FIG. 8, the network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and the data storage device 4200. The data storage device 4200 may be configured as the data storage device 100 shown in FIG. 1, the data storage device 1200 shown in FIG. 5, the data storage device 2200 shown in FIG. 6 or the data storage device 3200 shown in FIG. 7.

Figure 9:
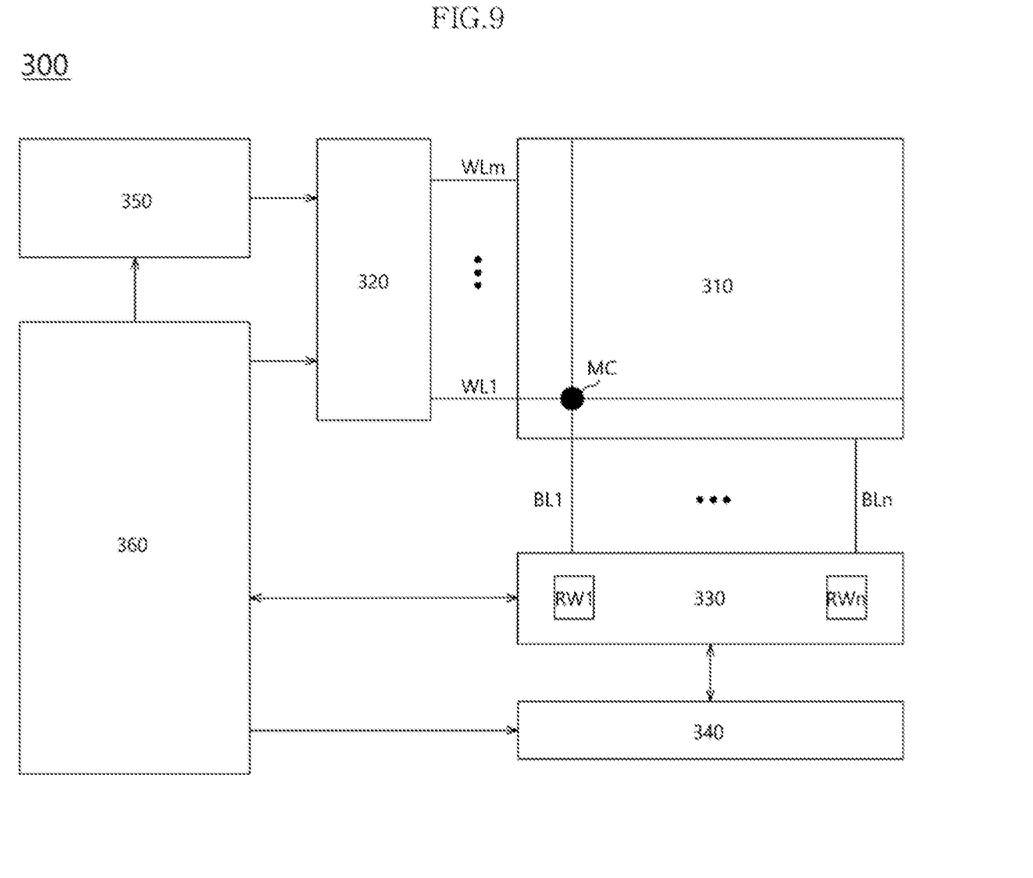
FIG. 9 is a block diagram illustrating a nonvolatile memory device included in a data storage device in accordance with an embodiment.

FIG. 9 is a block diagram illustrating a nonvolatile memory device 300 included in a data storage device in accordance with an embodiment. Referring to FIG. 9, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control operations of the nonvolatile memory device 300 such as read, write and erase operations of the nonvolatile memory device 300.

While various embodiments have been described above, it will be understood to those skilled in the art that the embodiments described are examples only. Accordingly, the data storage device and the operating method thereof described herein should not be limited based on the described embodiments.

What is claimed is:

1. A data storage device comprising:
  a controller including:
  a descriptor generator configured to generate a descriptor; and
  a memory controller configured to generate a command based on the descriptor; and
  a nonvolatile memory device including a cell region, and configured to read first data from the cell region and buffer the first data in response to a first read command transmitted from the memory controller and output the first data to the controller in response to a first cache output command transmitted from the memory controller,
  wherein, when transmitting a first read descriptor instructing generation of the first read command to the memory controller, the descriptor generator successively transmits the first read descriptor and an interrupt descriptor to the memory controller if no cache output descriptor is queued in a suspension queue, and keeps a first cache output descriptor instructing generation of the first cache output command, queued in the suspension queue, and
  wherein the memory controller generates an interrupt to the descriptor generator based on the interrupt descriptor, and transmits the first cache output command to the nonvolatile memory device according to an instruction of the descriptor generator for the interrupt.

2. The data storage device according to claim 1, wherein the memory controller generates the interrupt to the descriptor generator after transmitting a state check command to the nonvolatile memory device based on the interrupt descriptor.

3. The data storage device according to claim 1, wherein the descriptor generator transmits, when it is determined in response to the interrupt that a subsequent read operation to the nonvolatile memory device is not scheduled, the first cache output descriptor to the memory controller.

4. The data storage device according to claim 1, wherein the descriptor generator neglects the interrupt when it is determined in response to the interrupt that a subsequent read operation to the nonvolatile memory device is scheduled.

5. The data storage device according to claim 1, wherein, when a subsequent read operation to the nonvolatile memory device is scheduled while the first cache output descriptor is kept queued in the suspension queue, the descriptor generator successively transmits a second read descriptor for the subsequent read operation, the first cache output descriptor and the interrupt descriptor to the memory controller.

6. The data storage device according to claim 1, wherein, when the subsequent read operation to the nonvolatile memory device is not scheduled while the first cache output descriptor is kept queued in the suspension queue, the descriptor generator queues the first cache output descriptor in the suspension queue until the interrupt is generated.

7. A method for operating a data storage device, comprising:
  successively transmitting, by a descriptor generator, if no cache output descriptor is queued in a suspension queue when transmitting a first read descriptor to a memory controller, the first read descriptor and an interrupt descriptor to the memory controller;
  keeping, by the descriptor generator, a first cache output descriptor instructing generation of a first cache output command, queued in the suspension queue, when transmitting the first read descriptor to the memory controller;
  transmitting a first read command to a nonvolatile memory device based on the first read descriptor, by a memory controller;
  reading, by the nonvolatile memory device, first data from a cell region and buffering the first data in response to the first read command;
  generating, by the memory controller, an interrupt to the descriptor generator based on the interrupt descriptor;
  transmitting, by the memory controller, the first cache output command to the nonvolatile memory device according to an instruction of the descriptor generator for the interrupt; and
  outputting the first data in response to the first cache output command, by the nonvolatile memory device.

8. The method according to claim 7, further comprising, before the generating of the interrupt, transmitting a state check command to the nonvolatile memory device based on the interrupt descriptor.

9. The method according to claim 7, further comprising transmitting, by the descriptor generator, when it is determined in response to the interrupt that a subsequent read operation to the nonvolatile memory device is not scheduled, the first cache output descriptor to the memory controller.

10. The method according to claim 7, further comprising neglecting, by the descriptor generator, the interrupt when it is determined in response to the interrupt that a subsequent read operation to the nonvolatile memory device is scheduled.

11. The method according to claim 7, further comprising successively transmitting, by the descriptor generator, when a subsequent read operation to the nonvolatile memory device is scheduled while the first cache output descriptor is kept queued in the suspension queue, a second read descriptor for the subsequent read operation, the first cache output descriptor and the interrupt descriptor to the memory controller.

12. The method according to claim 7, further comprising:
    keeping, by the descriptor generator, the first cache output descriptor queued in the suspension queue until the interrupt is generated when a subsequent read operation to the nonvolatile memory device is not scheduled while the first cache output descriptor is queued in the suspension queue.

* * * * *